United States Patent [19]
Hoagland et al.

[11] 3,945,682
[45] Mar. 23, 1976

[54] METHOD AND APPARATUS FOR TRANSFERRING ARTICLES

[75] Inventors: John C. Hoagland, Windsor, Conn.; Robert Rutkowski, Northampton, Mass.; Jon D. Yonko, Vernon, Conn.

[73] Assignee: Monsanto Company, St. Louis, Mo.

[22] Filed: Nov. 4, 1974

[21] Appl. No.: 520,462

[52] U.S. Cl. .................. 302/12; 198/22 B; 198/32; 198/63
[51] Int. Cl.² .............. B65G 53/04; B65G 47/00
[58] Field of Search ......... 198/22 B, 52, 62, 63, 32, 198/25, 26, 41; 302/2 R, 27, 29, 52, 12; 243/20, 21; 221/301, 259

[56] References Cited
UNITED STATES PATENTS

| | | | |
|---|---|---|---|
| 1,718,607 | 6/1929 | Soubier | 198/22 |
| 2,167,049 | 7/1939 | Maurath et al. | 221/259 X |
| 2,461,290 | 2/1949 | Maynard et al. | 198/33 |
| 2,916,125 | 12/1959 | Wallberg | 193/40 |
| 2,943,722 | 7/1960 | Fauth | 198/32 |
| 3,028,865 | 4/1962 | Hagenah et al. | 302/62 X |
| 3,164,269 | 1/1965 | Roosevelt | 198/41 X |
| 3,332,724 | 7/1967 | Doucet | 302/2 R |
| 3,490,630 | 1/1970 | Sullivan | 214/300 |
| 3,628,649 | 12/1971 | Arvisenet | 198/32 |
| 3,672,727 | 6/1972 | Griffin | 302/2 R |
| 3,856,131 | 12/1974 | Flamand et al. | 198/26 |

*Primary Examiner*—Allen N. Knowles
*Assistant Examiner*—Hadd Lane
*Attorney, Agent, or Firm*—Michael J. Murphy

[57] ABSTRACT

In transfer apparatus for receiving lightweight articles such as containers made of plastic material, from a chute, and delivering them to a conveying means, the combination is provided of a turntable or dial having partition members forming circularly disposed receiving pockets rotatable in a generally horizontal plane below and successively in registry with the chute discharge opening, such pockets arranged for removal of the articles by the conveying means in a horizontal direction on reaching a discharge area on an arcuate path of travel thereof. Pocket loading means synchronized with movement of the dial are preferably used. The method involves successively feeding the articles individually at regular intervals to the rotating pockets, advancing the articles in the pockets along an arcuate path to a discharge area and continuously moving each article out of such discharge area in a direction generally tangential to the arcuate path.

23 Claims, 9 Drawing Figures

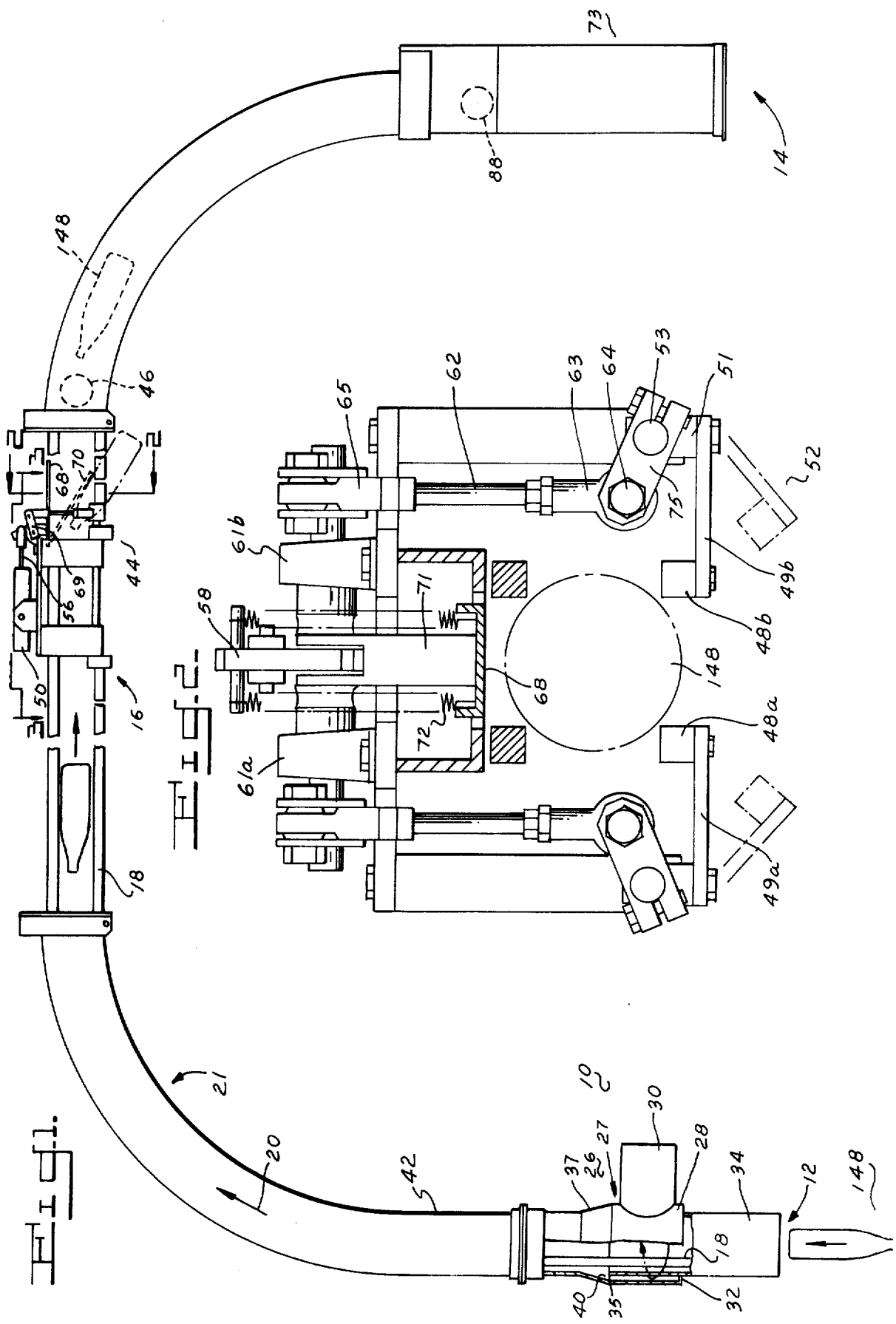

METHOD AND APPARATUS FOR TRANSFERRING ARTICLES

CROSS REFERENCE TO RELATED U.S. APPLICATIONS

Ser. No. 450,557, filed Mar. 13, 1974.

BACKGROUND OF THE INVENTION

This invention relates to transferring articles and more particularly to transferring lightweight articles such as containers made of thin-walled plastic material from a chute assembly to a conveying means.

It is well known to mold thermoplastic materials into articles such as lightweight containers, e.g. bottles, typically weighing from about 15 to 250 gms., and, as disclosed in U.S. Pat. No. 3,776,991, to transfer them from the molding area to a downstream location via a conveying duct using partial vacuum therein as a transfer assist.

As far as is known, however, systems for transferring such lightweight articles in a trouble-free manner at high commercially practicable rates, particularly when necessary to present them in an orderly spaced arrangement to the downstream conveying means, are noticeably absent in the prior art.

SUMMARY OF THE INVENTION

Now, however, a system has been developed for reliably and consistently transferring articles such as lightweight containers between work stations.

Accordingly, it is a principal object of this invention to provide method and apparatus improvements in handling lightweight articles such as hollow, elongated plastic containers having a height greater than the maximum crosswise dimension.

A further object of this invention is to provide method and apparatus improvements particularly suitable for use immediately downstream of a chute system through which articles pass from an upstream station.

Another object of this invention is to provide method and apparatus improvements in an article inverting system which facilitates high speed removal of unstable lightweight articles from such system without jamming or damaging the articles.

A specific object of this invention is to provide method and means for removing thin-walled, lightweight, plastic bottles at very high rates from one or more chute assemblies and presenting them in an upright, spaced apart relationship for conveying to a downstream station.

Other objects of this invention will in part be obvious and will in part appear from the following description and claims.

These and other objects are accomplished in transfer apparatus for receiving lightweight articles, such as containers and the like made of plastic material, and delivering them in side-by-side relationship substantially uniformly spaced from each other, which apparatus includes a chute assembly having openings for receiving and discharging the articles and conveying means for successively moving the articles away from the discharge opening, by providing the combination therewith of articles presenting means between the chute assembly and conveying means having upright partition members forming article-receiving pockets spaced from each other and movable in a generally horizontal plane beneath the discharge opening, such pockets arranged to allow unobstructed removal of articles therefrom by such conveying means in a generally horizontal direction at a localized area along a path of movement.

Preferably, pocket loading means synchronized with movement of the pockets are used to deliver articles at regular intervals to the pockets from the discharge opening of the chute assembly.

From a process standpoint, there is provided a method of handling lightweight articles such as containers and the like made of plastic material, which comprises successively feeding the articles in upright position individually at regular intervals to pockets of a rotating turntable moving transverse to the direction of feeding, advancing the articles in the pockets successively along an arcuate path to a discharge area, and continuously moving each article out of such discharge area in a direction generally tangential to the arcuate path.

BRIEF DESCRIPTION OF THE DRAWINGS

In describing the overall invention, reference will be made to the accompanying drawings wherein:

FIG. 1 is a partially schematic, front, elevational view of a chute assembly usable in the present invention;

FIGS. 2 and 3 are views on an enlarged scale along 2—2 and 3—3 of FIGS. 1 and 2 respectively;

DETAILED DESCRIPTION OF ILLUSTRATED EMBODIMENTS

Figure 5:
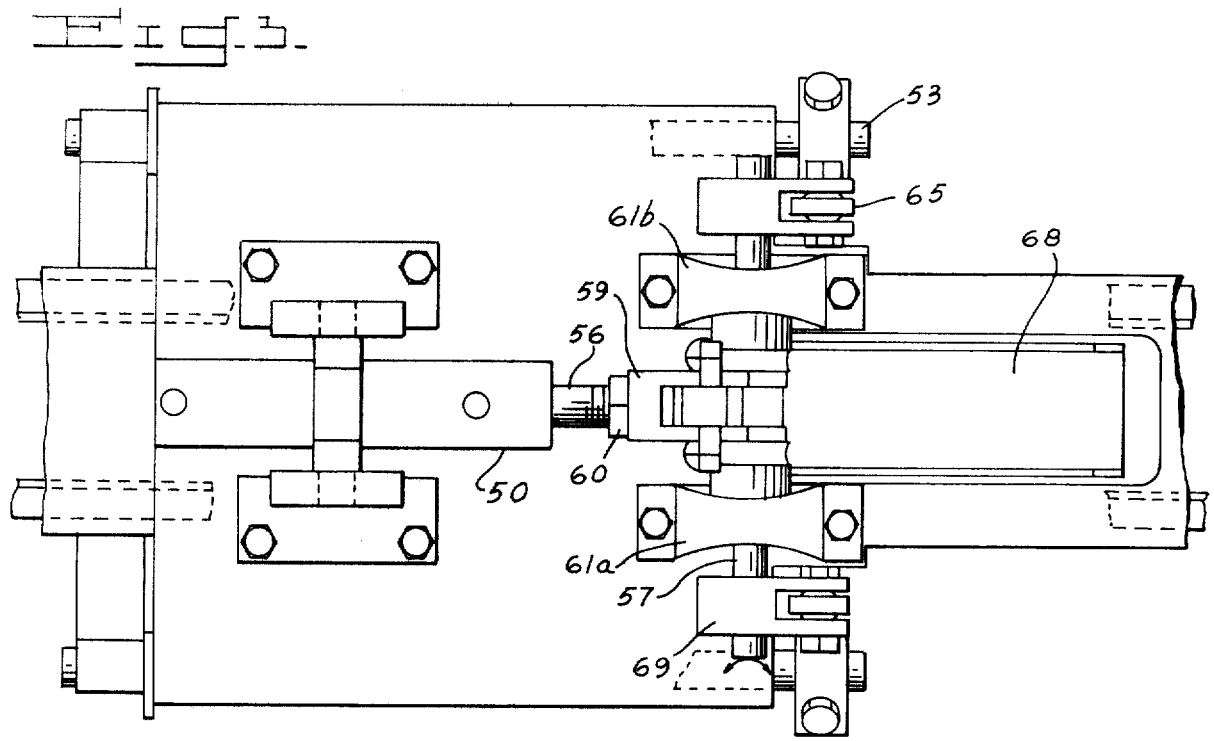
FIG. 5 is a sectional plan view of apparatus embodying a feature of the invention usable in the structure of FIG. 4.

Referring now to the drawings, a chute assembly, generally indicated as 10, is illustrated in FIG. 1, having a receiving opening 12 at one end and a discharge opening 14 at its other end. Though the overall profile of assembly 10 may vary and need not be symmetrical, in the embodiment of FIG. 1 it is substantially vertically disposed and has a generally U-shaped contour with openings 12 and 14 at a lower elevation than, and on either side of, arched central region 16. Though assembly 10 can be alternatively located, it is especially suited for use as a component of a container forming line which has an immediately upstream discharge station, not shown, where containers are presented for introduction into opening 12. Guide rails 18 may be used as required along all or portions of the length of assembly 10 for supporting and forming the flow confining surfaces for the articles moving therethrough in the direction of arrow 20.

Eductor means 26 (FIG. 1) includes at least one eductor 27 operatively associated with receiving opening 12 for accelerating articles introduced to assembly 10 toward discharge opening 14. Means 26 may vary in detail and a number of spaced eductor units 27 can be employed depending on the total length of assembly 10. In the illustrated embodiment, the interior of eductor housing 28 is in open communication via tangential conduit 30 with a source of fluid pressure such as a conventional air blower, not shown. Short lateral end wall 32 closes one end of the annular space between housing 28 and tubular portion 34 which is spaced inwardly from housing 28 and terminates at 35 opposite tapered portion 37 of housing 28, thereby forming annular venturi 40. Thus, air entering through nozzle 30 swirls forwardly in a generally spiral path into the next most downstream tubular portion of assembly 10 through venturi 40, thereby creating negative pressure in the vicinity of venturi 40 and within portion 34 for pulling articles issuing from the upstream discharge station into assembly 10. With the configuration of FIG. 1, the portion of assembly 10 up to approximately the end of 90° ell portion 21 is therefore preferably circumferentially closed via the wall forming tubular section 42 in order to confine the high velocity article-propelling air stream, whereas that downstream of such ell portion 21 is preferably open to allow the air to escape freely to the surroundings, rails 18 only being necessary to guide the articles in such downstream portion. Such conveying air, however, could alternatively be fed back to the inlet of the blower supplying conduit 30 for closed loop recirculation. Also, though eductor means 26 are preferably used to insure that each article is positively accelerated, if the articles entering opening 12 already have a velocity sufficiently high to carry them through at least arched region 16, eductor means 26 may not be required.

Dumpgate means, generally indicated as 44 (FIGS. 1-3), are preferably located somewhere along the length of assembly 10 such as in, or downstream of, arched portion 16. Such means 44 may be manually operable or, as illustrated, automatically actuated on receipt of a control signal from a suitable high level sensor such as a conventional photocell schematically shown as 46. In the illustrated structure, means 44 includes rail segments 48a and 48b on support arms 49a, 49b each of which is mounted for up and down arcuate movement via a connector 51 secured to the end of a support arm 49 and to rotary mounted, fixed pivot shaft 53, such movement being initially generated by linear movement of rod portion 56 of conventional fluid operated actuator assembly 50. In so moving, rail segments 48 pivot from a normal operative position, shown in full lines in FIG. 2, along the path of movement of the articles within assembly 10, to an inactive position shown in outline form at 52, clear of such path of movement. To further describe the function of the other illustrated parts of means 44 — on forward reciprocation of rod portion 56 from the position of FIGS. 2 and 3, horizontally disposed pivot shaft 57 will turn since rotatably journaled in pillow blocks 61a, 61b and connected to rod 56 by vertical linkage 58, clevis 59 and threaded nut 60. This rotary movement causes each rod 62 of the illustrated pair to move angularly downwardly since it carries threaded upper member 65 on its upper end which is movably associated with shaft 57 via linkage arm 69, and has threaded lower member 63 pivotally connected to movable pivot 64. Such downward movement is transmitted to each shaft 53 by linkage arm 75, thus causing support arms 49 carrying rail segments 48 to pivot downwardly to the position shown at 52. Diverter 68, welded to the lower end of connector 71 which turns with pivot shaft 57 will move downwardly with the turning of shaft 57 to the position shown at 70 in FIG. 1 to positively block the opening in assembly 10 downstream of means 44. This insures that all articles, which may continue to be fed into the system through opening 12 when means 44 is in dump position, are diverted to a suitable collection means, not shown. Diverter 68 may be resiliently mounted via springs such as 72, to allow rail segments 48 to pivot downwardly independent of the position of diverter 68, should, for example, a dump signal from sensor 46 be received while an imperfect article is wedged between diverter 68 and the surfaces defining the flow opening immediately beyond rail segments 48.

Figure 6:
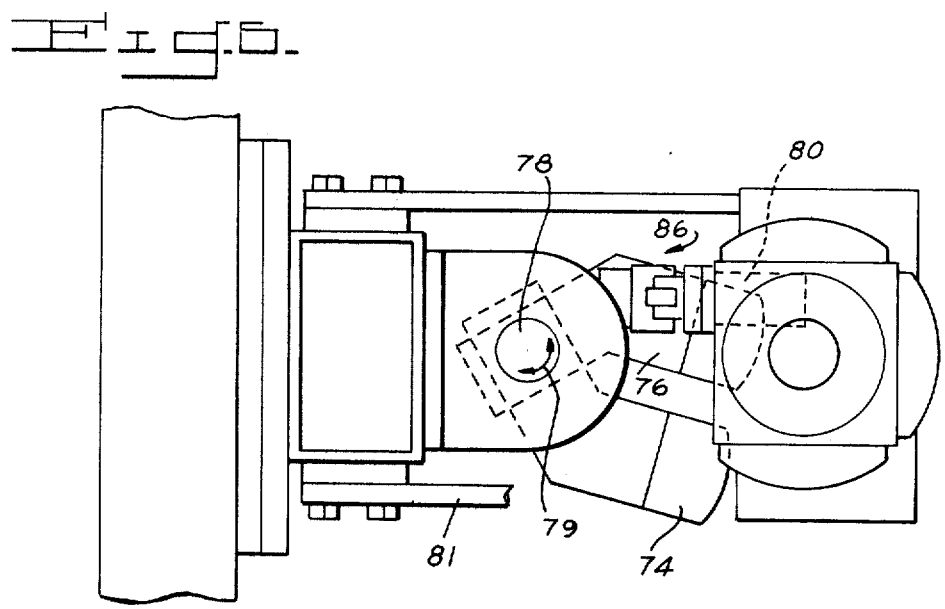
FIG. 6 is a sectional view along 6—6 of FIG. 4.
Figure 4:
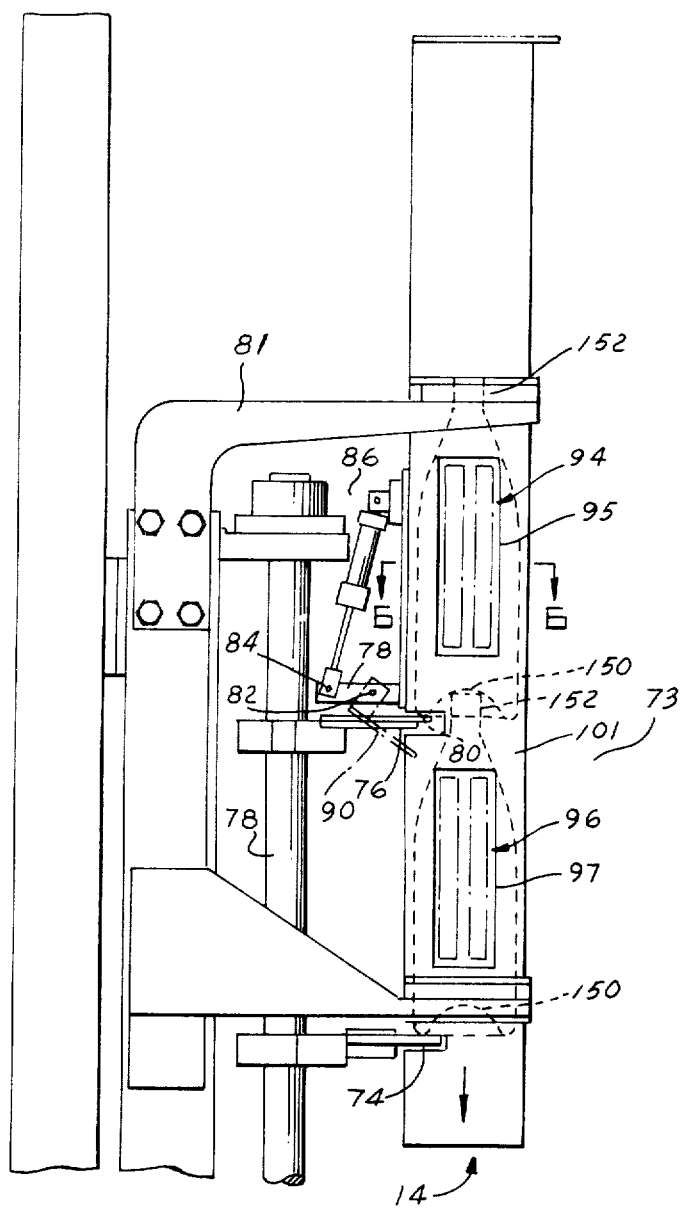
FIG. 4 is an elevational view in detail of a portion of the structure of FIG. 1 adjacent the discharge end thereof.
Figure 5:
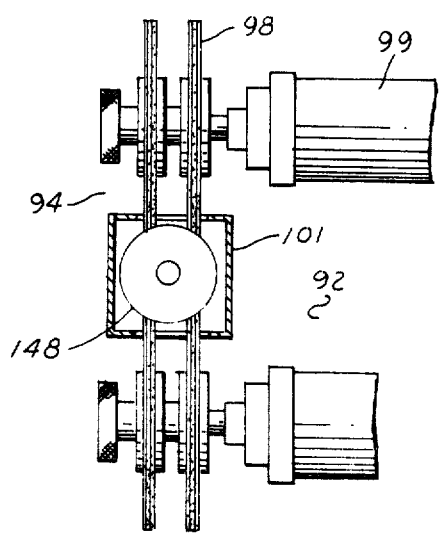

Loading means generally indicated at 73 (FIGS. 1, 4 and 6) are provided for delivering articles being conveyed to a downstream dial assembly from discharge end 14. Though means 73 may vary in detail, the preferred embodiment comprises a pair, i.e. upper 74 and lower 76, of vertically spaced paddles above a dial loading position, to be described. Paddles 74, 76 (FIG. 6) are offset from each other and mounted via conventional brackets to shaft 78 which is vertically supported by structure 81 and arranged for oscillating movement (note arrows 79 in FIG. 6) in synchronism with other downstream means for receiving the articles, to be described. In the position of FIGS. 4 and 6, the forwardmost end portion of upper paddle 76 is within the flow path of the articles while the corresponding end portion of lower paddle 74 is out of such path. On oscillation of shift 78 through an arc of about 30° from that depicted, paddles 74 and 76 reverse position with respect to the flow path such that lower paddle 74 protrudes therein whereas upper paddle 76 does not.

Stop member 78 between level sensor 88 and loading means 73 (FIG. 4) having finger portion 80 may be provided for insertion into the flow path of the articles to prevent passage beyond such point. Member 78 is attached at one end via movable pivot 84 to a rod portion of conventional fluid actuator 86 and arranged intermediate its ends to move about fixed pivot 82. Thus, on signal from low level sensor 88 (FIG. 1) finger portion 80 is pivoted up into obstructing position shown in solid lines in FIG. 4 via actuator 86 in order to provide for a buildup of articles within assembly 10 prior to any further passage through loading means 73. The reverse action occurs, i.e. the obstruction is eliminated when sensor 88 is satisfied and finger portion 80 is caused to move downwardly about pivot 82 to the inoperative position shown in FIG. 4.

As an optional feature of the invention usable with very high throughput rates to augment gravity drop of the articles into and out of pocket loading means 73, accelerating means, generally indicated in FIG. 5 as 92, associated with pocket loading means 73 and the lower container presenting means, to be described, may be provided. In the illustrated embodiment such means 92 comprises an upper set 94 above upper paddle 76 and a lower set 96 between paddles 76 and 74 of reversely rotatable wheel pairs, one wheel of the eight envisioned typically indicated as 98 in FIG. 5 and having a yieldable surface such as a fabric covering. Upper and lower wheel sets 94, 96 (FIG. 4) would be positioned in the article flow path via opposing slot pairs 95, 97 in the terminal portion 101 of chute assembly 10. Each wheel pair of a set 94, 96 is spaced opposite each other (FIG. 5) a distance less than the maximum crosswise dimension of the articles being handled. Provisions such as a track mounting for the wheel supports, may be provided for adjusting the space between opposing wheel pairs as necessary to accommodate different sized articles. Suitable conventional means such as one or more electric motors 99 and intermediate gearing or pulleys are provided to rotate wheels 98 at the desired peripheral speed, which speed will define the acceleration imparted to the articles passing therebetween. An alternative version of accelerating means in the form of forwardly directed air jets impinging on the articles has also functioned satisfactorily.

Figure 7:
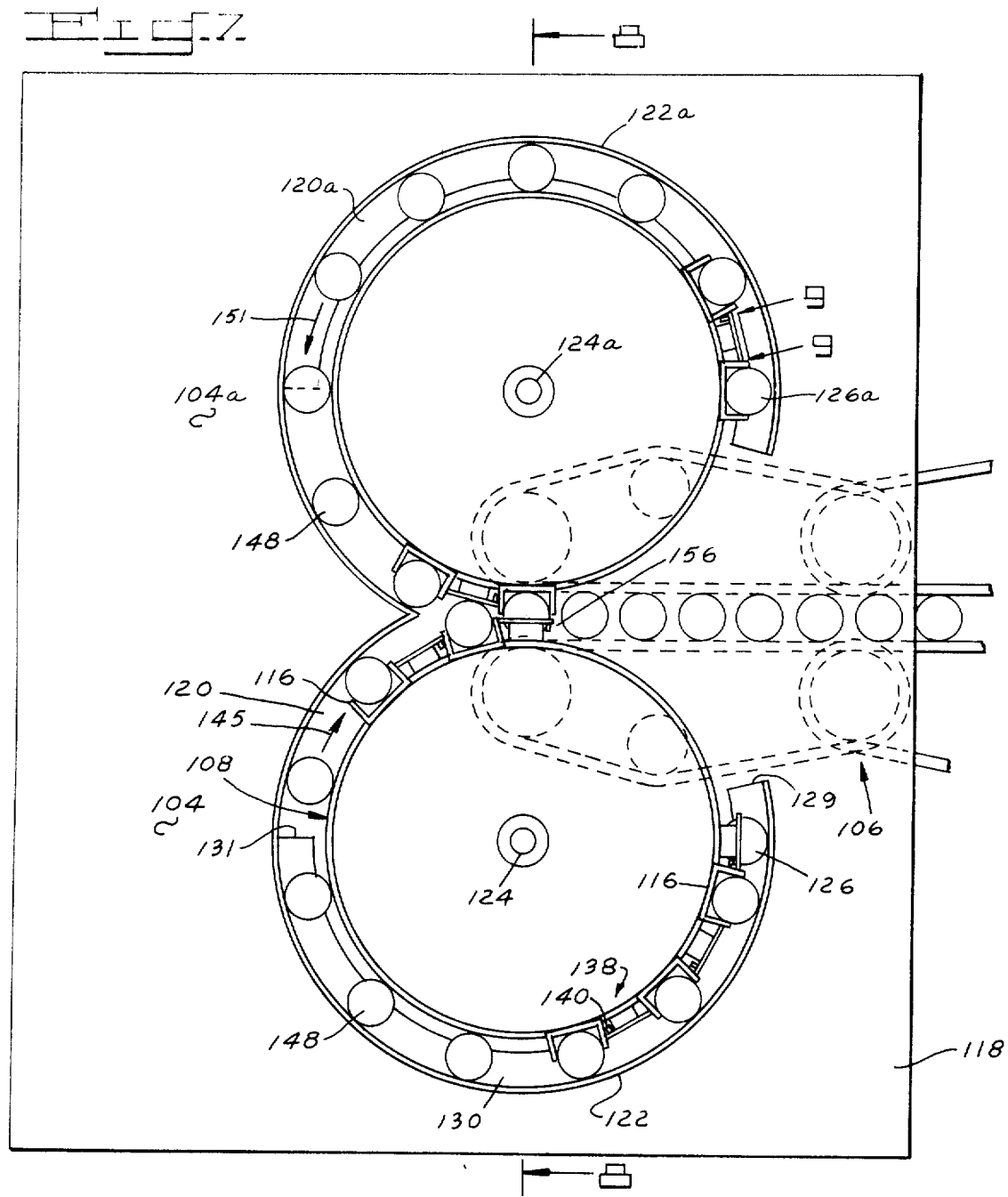
FIG. 7 is a plan view of apparatus embodying the invention situated downstream from that depicted in FIG. 4.
Figure 8:
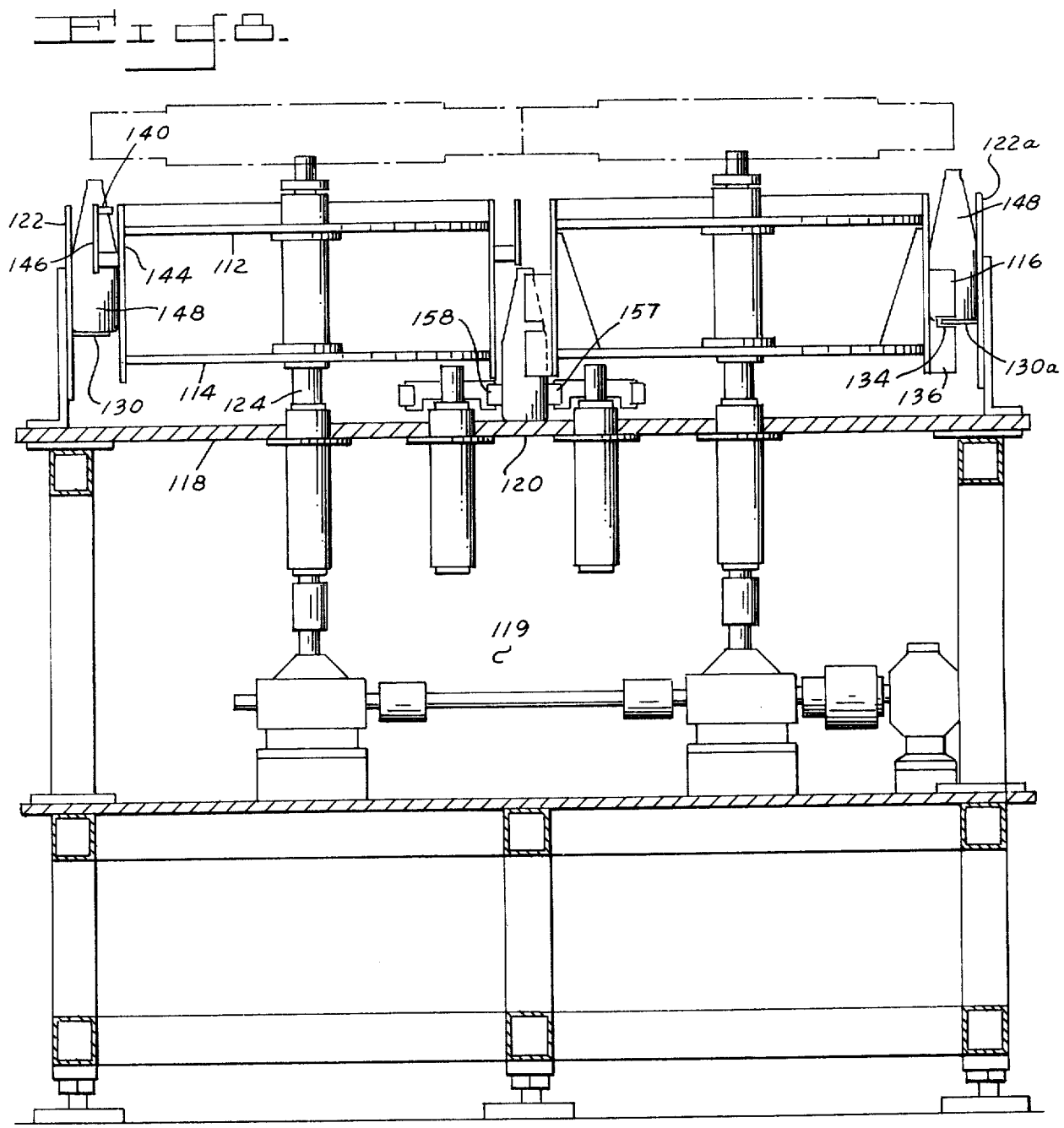

In accordance with the invention, dial means or article or container presenting means, generally indicated at 104 (FIGS. 7–9), are provided beyond pocket loading means 73, between discharge end 14 and conveying means 106 (FIG. 7). Though a single such means is functional, in the embodiment of FIGS. 7 and 8, dual, adjacent means are shown, the second being identified as 104a, and since both are identical only one will be specifically described. Means 104 comprises a circular turntable which may be one piece or, as in the illustrated embodiment, include upper 112 and lower 114 disc members (FIG. 8) mounted for rotation in a horizontal plane, such turntable-defining members being collectively referred to as 108 in FIG. 7. Outwardly opening, generally U-shaped partition members 116 are supported from and equally spaced around the peripheral edges of members 112, 114. Planar table member 118 below member 114 has (FIG. 8) surface portions such as at 120 outwardly subjacent the periphery of members 112, 114 which support the articles when within partition members 116 and moving along segments of a circular path to be further described. Fixed, upstanding outer guide 122 supported from table member 118 is spaced outwardly of partition members 116 and extends around (FIG. 7) a substantial portion (on the order of 270°) of the periphery of members 112, 114. Means for imparting rotation to turntable 108 include drive shaft 124 mounting upper and lower disc portions 112, 114 which is rotatably supported via conventional bearings from table member 118. A motion transmitting assembly of conventional design employing an electric motor as prime mover, intermediate drive shafts, gearboxes, couplings etc. well known to those skilled in the art, and schematically generally illustrated as 119 in FIG. 8 may be employed to rotate shaft 124 and turntable 108.

An upper, generally C-shaped platform 130 having loading 129 and exit 131 ends and supported from outer guide member 122 may optionally be provided to bottom support the articles at a first elevation above that of table member 118 such that the uppermost ends are well above the adjacent surfaces of the dial means during a substantial portion, e.g. on the order of 180°, of the arcuate path of travel of the articles. Secondary operations, e.g. finishing or inspecting the surface defining an open end, may be conveniently performed on each article during such period of elevated support whereupon on reaching end 131 it falls by gravity to a lower level defined by table surface portion 120 where the articles may be more accessible to downstream conveying means 106. When this double tier approach is used, each partition member 116 has a slot 134 to accommodate platform 130 during rotation of the turntable, plus a lower extension 136 below slot 134 (FIG. 8) for enclosing the article beyond end 131 of member 130.

For unusually high handling rates wherein the speed of the moving parts of a single system necessary to accommodate such throughputs becomes impractical because of the inertia of the cycling components, a second means 104a laterally adjacent that just described may be added to accommodate an adjacent pocket loading means and chute assembly, not shown, identical to that feeding assembly 104. Planar table member 118 may be enlarged with dual systems to provide article and structural support in the manner described for means 104. A single drive assembly, as illustrated, may be used for turning both turntables.

Figure 9:
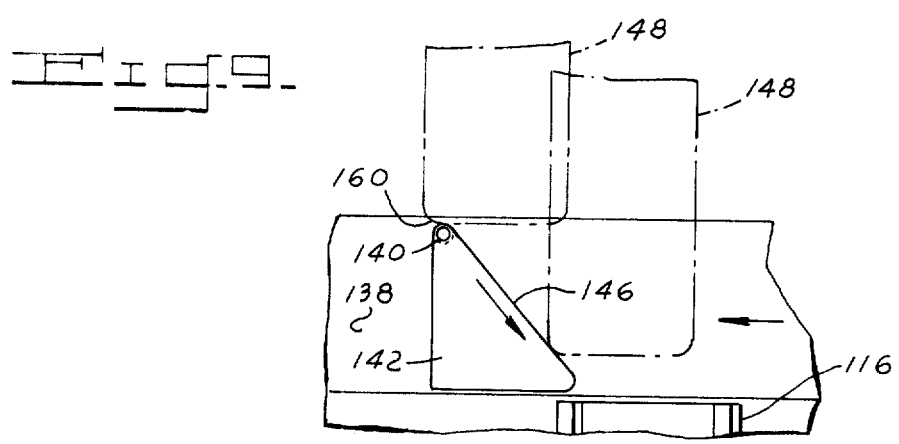
FIGS. 8 and 9 are sectional views along 8—8 and 9—9 of FIG. 7 respectively.

As another optional feature, means 138 (FIGS. 7–9) operatively associated with a turntable 108 may be provided for guidedly directing successive articles within partition members 116. Such means comprises a series of rounded pegs 140, one for each partition member 116, arranged around the periphery of and movable with turntable 108. Each peg 140 projects toward the axis of turntable 108 and is mounted at the crest of generally triangular shaped cam member 142 which is secured to a vertical plate 144 fastened to the peripheral edge of discs 112, 114. One cam member-peg combination is between (FIG. 7) and above (FIG. 8) each adjacent pair of partition members 116. Inclined profile surface 146 of cam member 142 extends rearwardly of its associated peg 140 in a circumferential direction (FIG. 9).

In operation, a continuous succession of articles (FIG. 1) are either manually or automatically inserted or propelled, e.g. via a jet of high velocity air, upwardly into chute assembly 10 through entrance end 12 from an upstream station, not shown. Though articles capable of being handled by the system of the invention may vary widely in size and shape, such system is especially suitable to handle hollow, relatively lightweight articles weighing about 15 to 250 grams, such as containers, e.g. empty bottles made of relatively thin-walled (e.g. about 15 to 150 mils) thermoplastic material, having a pronounced tendency to tip over. In the embodiment shown the articles are in the form of such bottles 148 and are preferably all regularly oriented in a particular attitude, i.e. upside down, on entering end 12, though alternative orientations may also be accommodated. On entering end 12, the reduced pressure generated within portion 34 accelerates the lightweight bottles upwardly in continuous succession through the arched flow path defined by the flow confining space between rails 18 such that on entering the vertical terminal portion of assembly 10 which houses loading means 73, each bottle is in an inverted, upright position.

At startup of the system, or at any time thereafter when there are no bottles opposite low level sensor 88, stop finger 80 is in bottle-blocking position (FIG. 4), shaft 78 is oscillating moving paddles 74 and 76 alternately into and out of the flow path of bottles 148, and, when two are in use, the turntables of dial means 104, 104a are rotating continuously in opposite directions. If accelerating means 92 are in use, each wheel pair of a set 94, 96 is likewise rotating in opposite directions. When sensor 88 is satisfied, finger portion 80 pivots downwardly out of the flow path allowing wheels 98 of upper set 94 to propel the lowermost bottle 148 downwardly against lower paddle 76. The signal from sensor 88 should be synchronized via conventional circuitry and timing switches such that finger portion 80 moves down when upper paddle 76 is within the flow channel, since if it is out of the channel the dropping bottle may not have passed beyond paddle 76 before the latter moves back into the flow channel, and if this occurs puncturing of the plastic wall can occur. Similar timing is necessary for the same reason in moving finger 80 into the flow channel. It is also to avoid damaging the bottles that sensor 88 is necessary at all, since if not used and no backup of bottles in the system occurs, the intent being that whenever a bottle is presented to loading means 73 it would be handled on an as-received basis, it is possible that a bottle could be delivered when upper paddle 76 is out of the flow path and be damaged when such paddle moves into the flow path before the bottle proceeds beyond it.

Oscillation of lower paddle 74 out of the way after the lowermost bottle has been propelled against it allows lower wheel set 96 or alternatively one or more air jets, to propel such bottle toward a pocket of the dial means and directly into it, if the guide means feature 138 is not used. Such pocket in the embodiment illustrated is defined by the space within a U-shaped member 116 and the opposing surface portion of outer guide member 122. This cyclic movement continues resulting in a successive feeding of individual bottles 148 at regular intervals, from the end of the flow path within assembly 10 to the pockets of turntable 108 in a feeding direction perpendicular to the direction of turntable rotation. Feeding frequency is determined by the oscillating frequency of paddles 74 and 76 and the synchronized peripheral speed of each turntable 108. The bottles enter the peripheral path of movement in the illustrated embodiment at the station identified as 126 in FIG. 7. The oscillating movement of paddles 74, 76 whereby the next bottle is prevented from moving downwardly while the preceding one is being forwarded to the horizontally moving pocket is especially suitable when the bottles (FIG. 4) have a base portion 150 protruding upwardly into the body and a reduced diameter neck portion 152 at the opposite end which will enter the concavity in the base of the prior container when stacked on end as in FIG. 4. If attempts are made to move the lowermost container sideways under these circumstances without first moving its neck portion vertically out of the concavity, such neck portion will wedge against the base and jamming of the system will occur. With flat or relatively flat bottom containers or those without a reduced diameter neck, provisions for vertically moving one while holding the other in place may not be necessary.

To compensate for any slight variation in the timing between the position of lower paddle 74 and registration of the space within a U-shaped partition member below, means 138 may be used to guide the bottles into the pockets during feeding. This occurs by means of peg 140 temporarily obstructing downward movement, (either gravitational or accelerated) of a bottle 148 when the base of the latter strikes it in the manner illustrated in FIG. 9 with bottle 160. As the turntable continues to rotate, however, the interference is gradually eliminated in that peg 140 moves laterally out from beneath that particular container, while continued rotary movement allows it to slide down profile surface 146 into the space between the member 116 next successive to where the particular peg 140 - cam member 142 combination is located.

After each bottle is captured within a pocket in the manner just described, it is advanced in an arcuate path illustrated by arrow 145 with respect to assembly 104 in FIG. 7 and in the reverse direction 151 when a second assembly 104a is in use, to a discharge area generally indicated (FIG. 7) as 156. In area 156, each bottle 148 has a positive velocity component in a direction tangential to the arcuate path through which it is moving as a result of the rotary motion of the turntable.

Each bottle 148 is compressively engaged and carried away by gripping members such as endless belts 157, 158 (FIG. 8) as it moves through discharge area 156 preferably without stopping.

When dual assemblies are used, the timing must be initially arranged such that a partition member 116 of one turntable 108 is opposite of peg-cam combination of the other in the area 156 common to the peripheral path traversed by each. Then, during operation, bottles will be alternately carried out of common discharge area 156 from the pockets of each dial means without stopping movement via conveying means 106 operating in a direction normal to a plane through axes 124, 124a of the turntables.

Should the supply of bottles 148 increase beyond the capacity of the loading means and dial means to remove them, they will accummulate in assembly 10 in end-to-end relationship rearwardly of discharge end 14 until high level sensor 46 generates a control signal to shift rail segments 48 downwardly to a dump position. Thereafter, any further containers entering the system will fall out of the flow path into a suitable collection hopper, not shown, positioned below means 44.

The previous description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In container forming apparatus having a discharge station where containers are introduced into a conveying chute assembly;
    the combination therewith of:
    dial means adjacent a discharge end of said chute assembly having partition members forming circularly disposed pockets for said containers rotatable in a generally horizontal plane and successively alignable with said discharge end, said pockets arranged for removal of containers therefrom in a horizontal direction on reaching a discharge area on a rotary path of travel thereof, and dual platforms for successively supporting the containers at a first elevation and then a second elevation between the discharge end of the chute assembly and said discharge area from the dial means.

2. In container handling apparatus in which containers are discharged into a conveying duct assembly, the combination therewith of:
    A. container presenting means having partition members forming a series of container pockets continuously rotatable in a generally horizontal plane and successively movable beneath an opening of said duct assembly;
    B. pocket loading means synchronized with the movement of said pockets for delivering containers thereto at regular intervals from said opening;
    C. eductor means operatively associated with a receiving opening in said duct assembly for urging said containers toward said pocket loading means; and
    D. dump gate means between the eductor means and pocket loading means.

3. The apparatus of claim 2 wherein said pocket loading means comprises a pair of vertically spaced paddles offset from each other and arranged for oscillating movement alternately into and out of the space above a pocket.

4. The apparatus of claim 2 including accelerating means associated with the pocket loading means and the container presenting means.

5. The apparatus of claim 4 wherein said accelerating means comprises opposing reversely rotating wheels having yieldable surfaces spaced from each other a distance less than the maximum crosswise dimension of said containers.

6. The apparatus of claim 2 wherein said dump gate means includes rail segments mounted for movement from a normal operative position along the path of movement of said containers to an inactive position clear of said path of movement.

7. In container handling apparatus in which containers are discharged upwardly into a conveying duct assembly, the combination therewith of:
  A. container presenting means adjacent a discharge end of said duct assembly comprising:
    a. a dial assembly including:
      i. a circular turntable mounted for rotation in a horizontal plane;
      ii. outwardly opening, generally U-shaped partition members supported on and equally spaced around the periphery of said turntable;
      iii. a planar table member beneath said turntable having a border portion forming a bottom support for said containers when within said partition members;
      iv. a fixed, upstanding outer guide member spaced outwardly from said partition members and extending around a substantial portion of the periphery of said turntable; and
      v. means for imparting rotation to said turntable; and
  B. loading means for delivering containers to the dial assembly from the discharge end of said duct assembly comprising:
    a. a pair of vertically spaced paddles above a loading position successively occupied by the area circumscribed by said partition members, said paddles being offset from each other and mounted on a shaft arranged for oscillating movement in synchronism with the means for imparting rotation to the turntable.

8. The apparatus of claim 7 including means operatively associated with the turntable for guidedly directing successive containers within said U-shaped partition members.

9. The apparatus of claim 8 wherein said means for guidedly directing successive containers comprises:
  i. a series of pegs arranged around the periphery of and movable with the turntable, each peg adapted to be cyclically interposed between the lower of said pair of paddles and a U-shaped partition member; and
  ii. a cam associated with each peg having a profile surface extending rearwardly thereof in a circumferential direction for slidably guiding a container into position within a U-shaped partition member.

10. The apparatus of claim 7 including a generally C-shaped platform above the table member outwardly of said U-shaped partition members and extending around a portion of the periphery of the turntable.

11. In container-handling apparatus in which containers are discharged into a conveying duct assembly, the combination therewith of:
  A. container presenting means adjacent discharge ends of said duct assembly comprising:
    a. a pair of dial assemblies including:
      i. a pair of laterally adjacent, horizontally disposed circular turntables;
      ii. outwardly opening partition members secured to and equally spaced around the full periphery of each turntable;
      iii. a planar table member subjacent said turntables having a border portion forming a bottom support for said containers when within the partition members;
      iv. fixed, upstanding outer guide members outwardly spaced from said partition members and extending around a major portion of the periphery of each of said turntables; and
      v. means for rotating said turntables including:
        1. a drive shaft mounting each turntable rotatably supported from said table member; and
        2. a motion transmitting assembly for causing said shafts to turn together in opposite directions; and
  B. loading means synchronized with the movement of said drive shafts for delivering containers at regular intervals to the dial assemblies from the discharge ends of said duct assemblies.

12. The apparatus of claim 11 including a pair of endless gripping belt mounted for movement generally tangential to a common portion of the circular path traversed by the partition members of said dial assemblies.

13. The apparatus of claim 11 including:
  means operatively associated with each turntable for guidedly directing successive containers into position within said partition members.

14. In apparatus for handling lightweight plastic containers at high rates in which the containers are discharged into a conveying duct assembly, the combination therewith of:
  A. container presenting means having partition members forming a series of container pockets continuously rotatable in a generally horizontal plane and successively movable beneath an opening of said duct assembly;
  B. pocket loading means synchronized with the movement of said pockets for delivering containers thereto at regular intervals from said opening; and
  c. accelerating means adjacent said opening and associated with the pocket loading means and container presenting means for accelerating each lightweight container from the pocket loading means to the pockets of the container presenting means.

15. In container handling apparatus in which containers are discharged into a conveying duct assembly, the combination therewith of;
  A. container presenting means having partition members forming a series of container pockets continuously rotatable in a generally horizontal plane and successively movable beneath an opening of said duct assembly;
  B. pocket loading means synchronized with the movement of said pockets for delivering containers thereto at regular intervals from said opening;
  C. a level sensor associated with the duct assembly before the pocket loading means for detecting the level of bottles within the duct assembly; and
  D. a movable stop member between the level sensor and pocket loading means in operative cooperation with the level sensor for selective positioning within the duct assembly on receipt of a signal from the level sensor.

16. A method of handling lightweight articles such as containers and the like made of plastic material which comprises:
  successively feeding said articles in upright position individually at regular intervals to pockets of a rotating turntable moving transverse to the direction of feeding;
  advancing such articles at one level in said pockets successively along a substantial portion of an arcuate path toward a discharge area;
  lowering the containers to another level while continuing advancement toward said discharge area; and
  continuously moving each article out of such discharge area in a direction generally tangential to said arcuate path.

17. In a method of handling lightweight articles, such as containers and the like made of plastic material, which method includes:
  propelling a continuous succession of regularly oriented articles along a flow path away from an upstream station;
  the improvement in such method which comprises:
  successively feeding said articles after traversing said path individually at regular intervals to pockets of a rotating turntable moving transverse to the direction of feeding;
  advancing such articles in said pockets successively along an arcuate path to a discharge area;
  continuously moving each article out of such discharge area in a direction generally tangential to said arcuate path; and
  automatically moving a guide rail portion extending along said flow path to an inactive position clear of said path when an excess number of said articles accumulate rearwardly of the end of said flow path.

18. The method of claim 17 including the step of accelerating the movement of each container into a pocket during said feeding.

19. In a method of handling lightweight articles, such as bottles made of plastic material, which method includes:
  conveying a continuous succession of such articles regularly oriented in a particular attitude through an arched flow path to cause them to be inverted at the end thereof;
  the improvement in such method which comprises:
  accumulating a plurality of said articles in end-to-end relationship rearwardly of the ends of two such flow paths;
  positively accelerating said lightweight articles individually at regular intervals from each of such two flow paths into pockets of a pair of turntables rotating in timed relation to said intervals and in meshing relationship with each other transverse to the direction of feeding;
  advancing such articles in the pockets of each turntable along an arcuate path in opposite directions to a common discharge area; and
  alternately moving an article from a pocket of each turntable out of such common discharge area without allowing it to stop therein in a direction normal to a plane through the axes of said.

20. The method of claim 19 wherein said articles are slidably guided downwardly into such pockets during feeding.

21. The method of claim 19 wherein said articles are compressively engaged by gripping members during movement out of said common discharge area.

22. In a method of handling lightweight articles, such as bottles, made of plastic material, which method includes:
  conveying a continuous succession of such articles, regularly oriented in a particular attitude, through an arched flow path to cause them to be inverted at the end thereof;
  the improvements in such method which comprise:
  accumulating a plurality of said articles in end-to-end relationship rearwardly of the end of such flow path;
  detecting the level of such accumulation;
  selectively placing an obstruction in the flow path until the accumulation reaches a pre-selected amount;
  eliminating said obstruction after said pre-selected amount is present;
  moving a paddle into and out of said flow path in a coordinated manner to successively feed said articles individually from the bottom of said accumulation at regular intervals to pockets of a turntable rotating transversely to the direction of feeding;
  advancing the articles in the pockets along an arcuate path to a discharge area; and
  continuously moving each article out of such discharge area in a direction generally tangential to said arcuate path.

23. The method of claim 22 wherein placement of an obstruction is accomplished by inserting a stop member into the flow path.

* * * * *